United States Patent [19]

Diehm et al.

[11] Patent Number: 5,226,946
[45] Date of Patent: Jul. 13, 1993

[54] VACUUM MELTING/CASTING METHOD TO REDUCE INCLUSIONS

[75] Inventors: Randall S. Diehm, Whitehall; Robert N. Weerstra, Muskegon; Blake K. Zuidema, Farmington Hills, all of Mich.

[73] Assignee: Howmet Corporation, Greenwich, Conn.

[21] Appl. No.: 890,965

[22] Filed: May 29, 1992

[51] Int. Cl.[5] .......................... C22C 1/00; C22B 4/00
[52] U.S. Cl. ...................................... 75/10.14; 420/590
[58] Field of Search ........................ 420/590; 75/10.14

[56] References Cited

U.S. PATENT DOCUMENTS

| | | | |
|---|---|---|---|
| 3,598,383 | 8/1971 | Moore | 420/590 |
| 3,693,698 | 9/1972 | Balevski et al. | 164/119 |
| 3,858,640 | 1/1975 | Sifferlen | 420/590 |
| 3,948,650 | 4/1976 | Flemings | 420/590 |
| 4,508,682 | 4/1985 | Miura | 420/590 |
| 4,770,697 | 9/1988 | Zurecki | 75/68 |
| 4,902,342 | 2/1990 | Wahlbeck | 420/590 |

Primary Examiner—Peter D. Rosenberg
Attorney, Agent, or Firm—Flynn, Thiel, Boutell & Tanis

[57] ABSTRACT

In the melting of one or successive alloy charges including one or more volatile alloying elements, each alloy charge is melted in a melting vessel under an inert gas partial pressure effective to reduce volatilization, migration and condensation of the volatile alloying elements and build-up of condensate deposits of the volatile elements on cool regions of the melting vessel and melting chamber where the deposits constitute inclusion precursors that can eventually enter successive charges melted in the vessel. Wetting of the crucible by the melt is also reduced by the gas partial pressure. The incidence of inclusions found in castings produced from the successive melts is thereby reduced.

22 Claims, 10 Drawing Sheets

VACUUM MELTING/CASTING METHOD TO REDUCE INCLUSIONS

FIELD OF THE INVENTION

The present invention relates to a method for reducing inclusion levels in the vacuum melting of successive alloy charges containing one or more volatile alloying elements.

BACKGROUND OF THE INVENTION

The presence of inclusions in superalloy investment castings is a concern of gas turbine engine manufacturers as the engine operating conditions, especially temperature, have become more severe. As is known, these inclusions can adversely affect the mechanical properties of the casting and, if present at a critical size, can cause catastrophic failure of the castings under the high temperature and stress conditions of engine service. Moreover, the adverse effect of inclusions on the casting properties may be exacerbated as the section size (e.g., wall thickness) of the castings is reduced for weight savings purposes. The presence of unacceptable levels and/or sizes of inclusions in investment castings results in excessive scrap rates that increase the overall cost of producing castings for use in gas turbine engines. The inclusion problem worsened as remelt vacuum levels and leak rates of casting equipment were improved.

Non-metallic and dross type inclusions can originate from several sources during the investment casting operation. For example, inclusions can be introduced by the master alloys used, by remelting in a ceramic crucible, by the remelting environment, and by mold/melt reactions that can occur during solidification, especially during the relatively long mold/melt contact periods required in the production of directionally solidified and single crystal castings.

In efforts to produce cleaner castings (i.e., castings with lower non-metallic inclusion levels), superalloys are typically remelted and cast under relatively high vacuum conditions (e.g., $<10^{-3}$ torr) to reduce the presence of residual oxygen and other gases in the remelting/casting atmosphere and/or in the melt. Typical remelting procedures employed include vacuum induction melting in a refractory crucible and "cold hearth" melting including vacuum arc, induction skull and electron beam melting in a water cooled metallic (e.g., copper) crucible. Despite this effort, unacceptably high inclusion levels may still be experienced in the production of certain superalloy investment castings that include one or more relatively volatile alloying elements, such as Cr and Al, especially during the melting of successive alloy charges in the same crucible.

SUMMARY OF THE INVENTION

It is an object of the invention to provide an improved method for reducing inclusion levels attributable to the vacuum melting in a melting vessel of one or successive alloy charges including one or more volatile alloying elements.

It is another object of the invention to provide an improved method for reducing inclusion levels attributable to formation of inclusion precursors at cool regions of the melting vessel during the melting of one or successive alloy charges therein.

It is still another object of the invention to provide an improved method for reducing inclusion levels attributable to wetting of the melting vessel by the melt during the melting of one or successive alloy charges therein.

The present invention contemplates the melting of one or successive alloy charges including one or more volatile constituents in a manner to reduce inclusions attributable to the melting operation. The present invention is based on the discovery that the problem of unacceptably high inclusion levels in vacuum melted alloys including one or more volatile constituents, (e.g., volatile alloying elements including Al, Cr, Mg, etc.) melted in a melting vessel arises from volatilization of such constituents under the temperature and pressure conditions of melting and the condensation of the volatized constituent as condensate deposits on cool regions of the melting vessel and associated melting chamber where the deposits constitute inclusion precursors that can enter the melt during the melting and/or casting operations to provide the observed high inclusion levels in the resultant casting. The condensate deposits may comprise metal oxides as a result of reaction of the volatile constituent with residual gas, such as oxygen in the melting chamber, during constituent migration from the melt and/or after constituent condensation on the cool regions. The condensate deposits build-up on the melting vessel and associated melting chamber as alloy charges are melted and cast and eventually reach a condition where entry of the deposits into the melt occurs.

One embodiment of the present invention involves establishing a gas partial pressure on the melted alloy charge effective to reduce mobility of the volatile constituent and formation of the inclusion precursors at cool regions of the melting vessel and chamber. Preferably, the gas partial pressure is established by introduction of an inert gas to the melting chamber prior to melting of the alloy by, for example, vacuum induction melting or "cold hearth" melting, and after evacuation of the vessel to a subambient pressure. The gas partial pressure is effective to minimize volatilization, migration and deposition of the volatile constituents while avoiding trapping harmful amounts of the gas in the casting produced from the melt.

In a particular embodiment of the invention, the alloy charge is melted in a ceramic crucible in a manner that a cool region lies between the melt line and an upper lip of the melting vessel (e.g., crucible). The melted charge may be tilt poured from the vessel into a casting mold such that the melted alloy flows over the cool region of the crucible where formation of the inclusion precursors is minimized or reduced by the presence of the gas partial pressure.

In melting one or successive charges of a nickel, cobalt or iron base superalloy including one of Al and Cr as an alloying element, the superalloy is melted in a ceramic crucible under an inert gas partial pressure effective to reduce volatilization of the Al and/or Cr alloying elements and formation/build-up of the inclusion precursor deposits on the cool regions of the crucible and melting chamber where they might enter the melt. An argon partial pressure in the range of about 50 microns and above is preferably established on the superalloy melt to this end. In melting superalloys for directional solidification, an argon partial pressure of about 5000 microns is used since the long residence time of the melt in the mold allows any entrapped argon gas to escape.

Another embodiment of the present invention involves establishing a gas partial pressure on the melt effective to reduce wetting of the melting vessel by the melt during the melting operation. This embodiment reduces the extent of wetting between the melt and the vessel and resultant erosion of the vessel over time so as to reduce inclusion levels in the melts attributable to the melting operation.

In the melting of successive nickel, cobalt, or iron base superalloy charges, this embodiment of the invention involves melting the superalloy charges in a melting vessel including a working ceramic (e.g., silica, zirconia, etc.) surface contacting the melt and establishing an inert gas partial pressure on the melt effective to reduce wetting of the inner surface of the melting vessel by the melt.

The present invention may be better understood when considered in light of the following detailed description of certain specific embodiments thereof which are set forth hereafter in conjunction with the following drawings.

DETAILED DESCRIPTION OF THE DRAWINGS

DETAILED DESCRIPTION OF THE INVENTION

The present invention is illustrated hereinbelow with respect to the vacuum induction remelting of successive charges of an alloy including one or more volatile constituents in a refractory melting vessel (e.g., ceramic crucible) in a manner to reduce formation/build-up of inclusion precursors on cool regions of the vessel and melting chamber. However, the invention is not limited to vacuum induction melting and can be practiced using other vacuum melting techniques such as the so-called "cold hearth" techniques of induction skull, electron beam and vacuum arc melting where the alloy charge is melted in a water-cooled metal (e.g., copper) melting vessel. Each charge is remelted and cast into a suitable refractory casting mold (e.g., a conventional ceramic investment mold). The remelt charge cast into the mold may be solidified by known techniques to produce equiaxed, directionally solidified, and single crystal castings. The invention may also be used in the alloy manufacture process where individual alloy constituents are blended and remelted by one of the aforementioned processes and cast into ingot molds.

Figure 1:
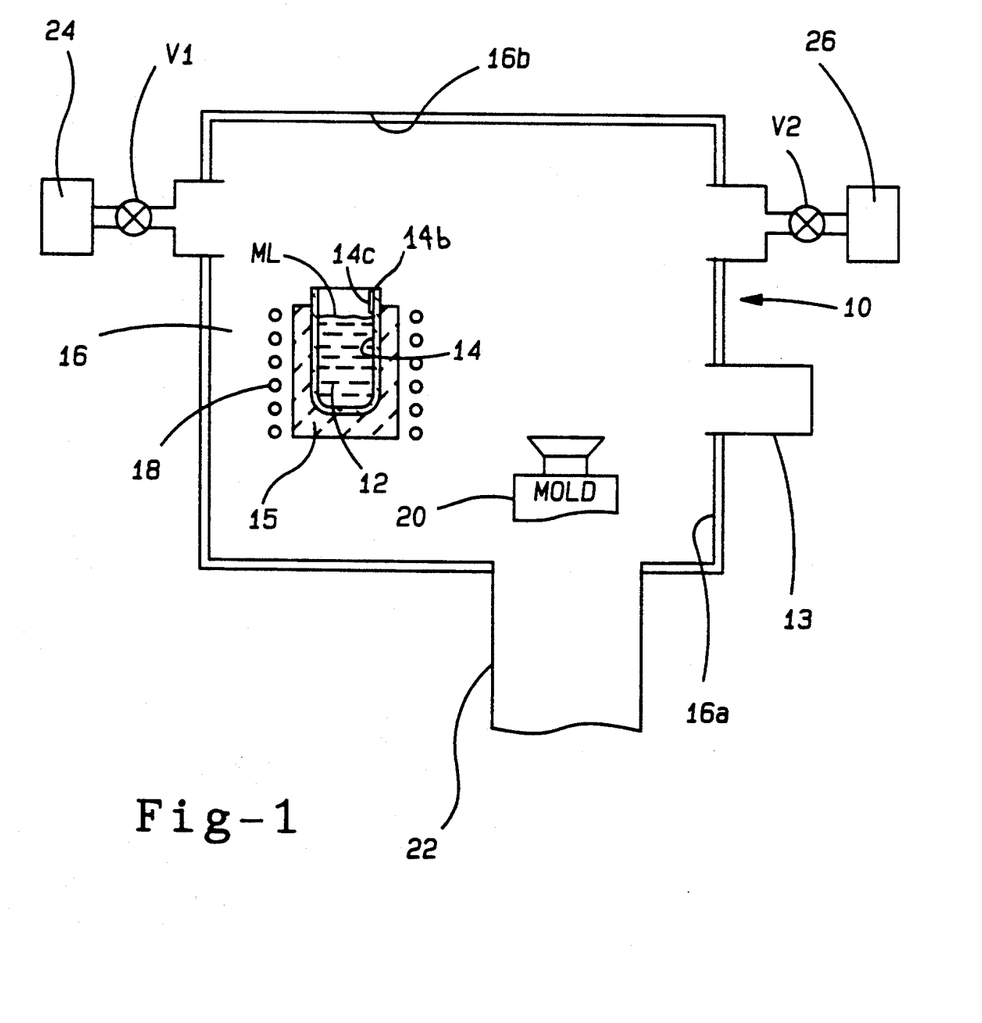
FIG. 1 is a schematic sectioned side view of a melting and casting apparatus for practicing one embodiment of the invention.
Figure 2A:
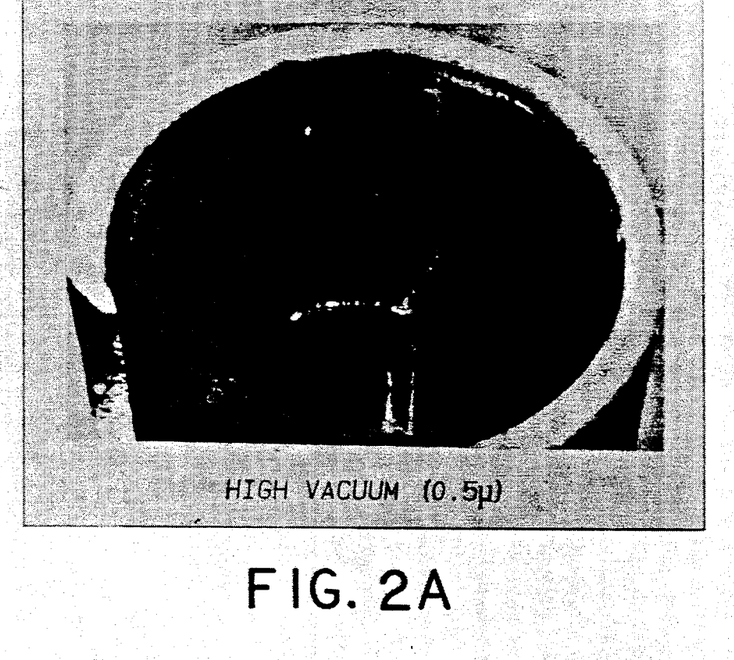
FIGS. 2a-2d are photographs of crucible liners showing the effect of argon partial pressure on condensate build-up on the liners.
Figure 2B:
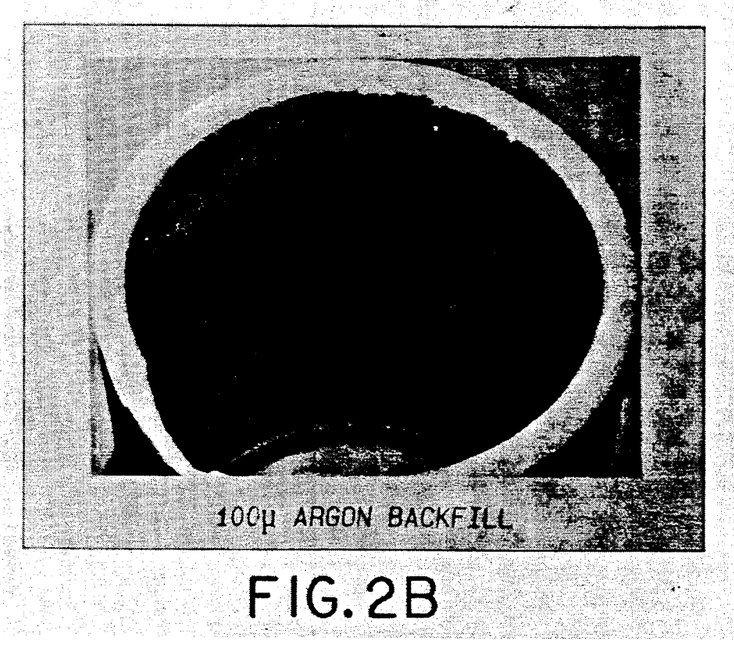
Figure 2C:
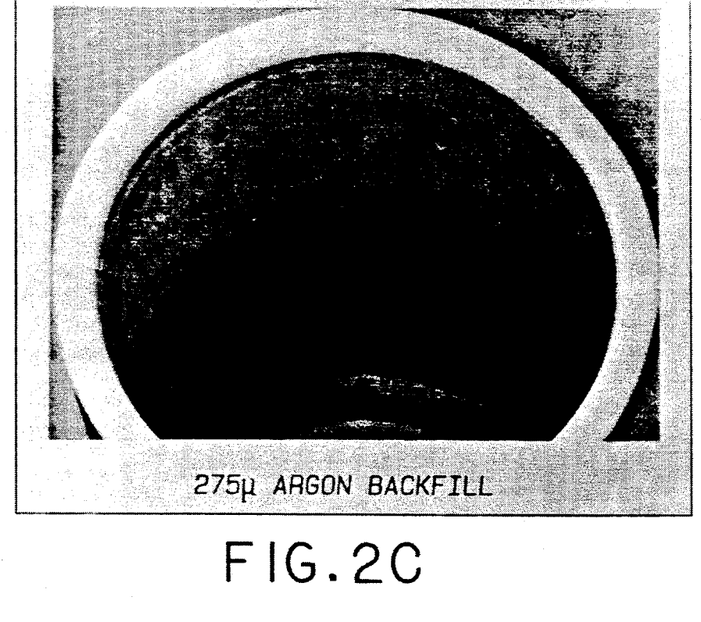
Figure 2D:
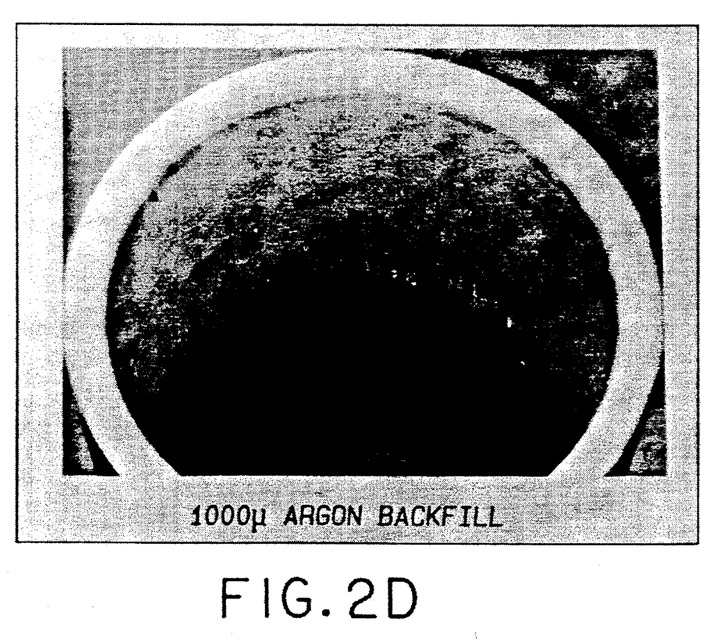

Referring to FIG. 1, a remelting/casting apparatus 10 is illustrated for vacuum induction remelting successive charges of a superalloy, which may include a nickel, cobalt, or iron base superalloys such as IN713LC, MAR-M-427, MAR-M-509, etc., in a ceramic crucible 14 enclosed in a melting chamber 16 having water cooled walls 16a. The ceramic crucible 14 is enclosed and supported by a ceramic member 15. An induction coil 18 is disposed about the crucible 14 in the chamber 16 and is energized by suitable electrical power in conventional manner to inductively heat and melt each charge in the crucible 14 to a desired casting superheat temperature (i.e., a temperature above the melting point of the superalloy). The crucible 14 is charged with the alloy through a vacuum charge interlock 13 in conventional manner.

Each superheated melt 12 (melted charge) is cast into a ceramic investment mold 20 which is positioned in the melting chamber 16 through a conventional vacuum interlock chamber 22 communicating to the melting chamber 16. The mold 20 can be positioned in the melting chamber before or after the charge is melted via the interlock chamber 22. The superheated melt 12 is cast into the mold 20 by tilting the crucible 14 using an associated conventional tilting device (not shown) in the melting chamber so as to pour the melt over a crucible pour lip 14b and into the mold 20. Those skilled in the art will appreciate that the melt can be cast in other ways; e.g., by "bottom pouring" through a suitable valved opening in the bottom of the crucible into a mold located beneath the crucible.

The melting chamber 16 can be evacuated to a desired subambient pressure by a vacuum pump 24 communicated to the chamber 16 via an associated conduit and valve V1 as shown. Moreover, for purposes to be described, the melting chamber 16 is communicated to a source 26 of inert gas (e.g., a conventional cylinder of high purity inert gas such as argon) external of the melting chamber via an associated conduit and valve V2 as also shown in FIG. 1.

Figure 3:
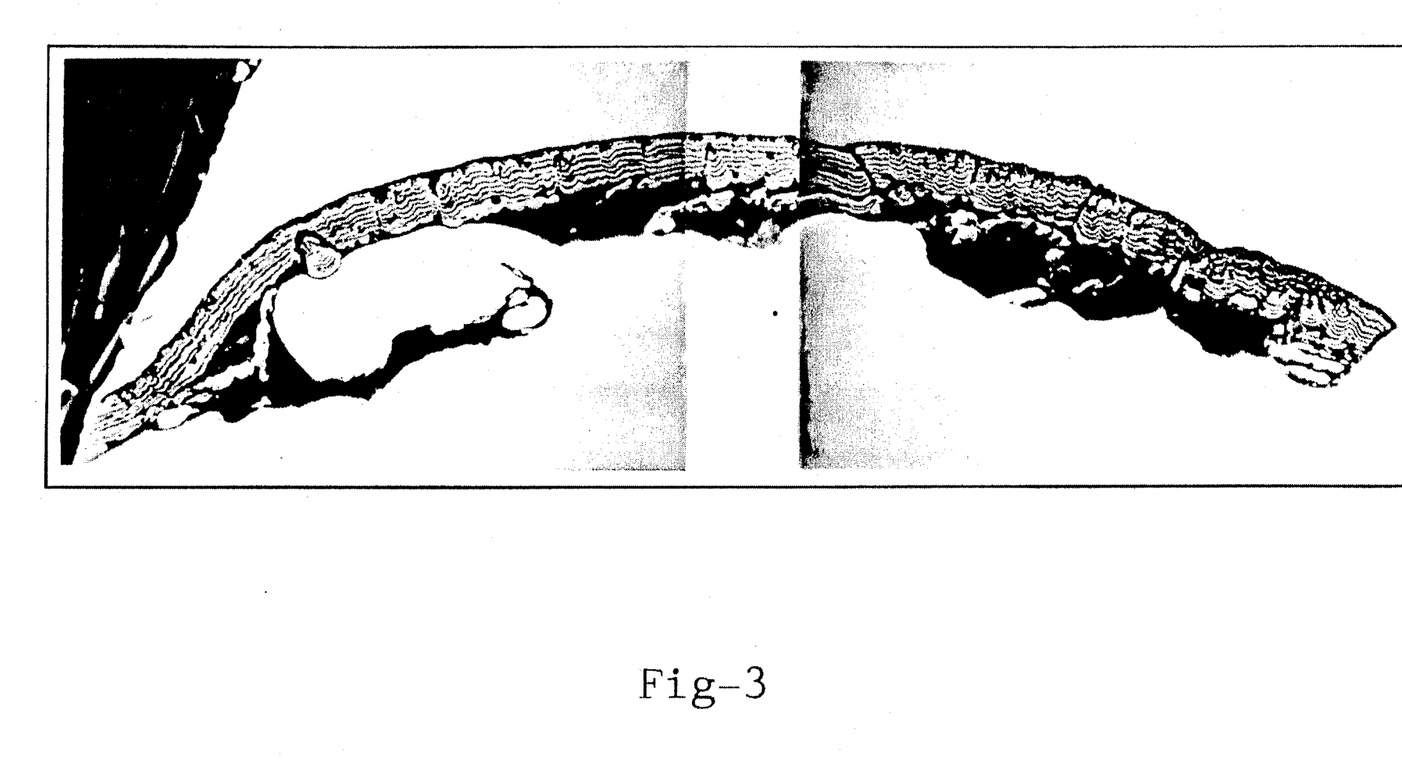
FIG. 3 is a photograph at 250X magnification of a typical inclusion showing laminated morphology attributable to condensate build-up on the crucible.
Figure 4A:
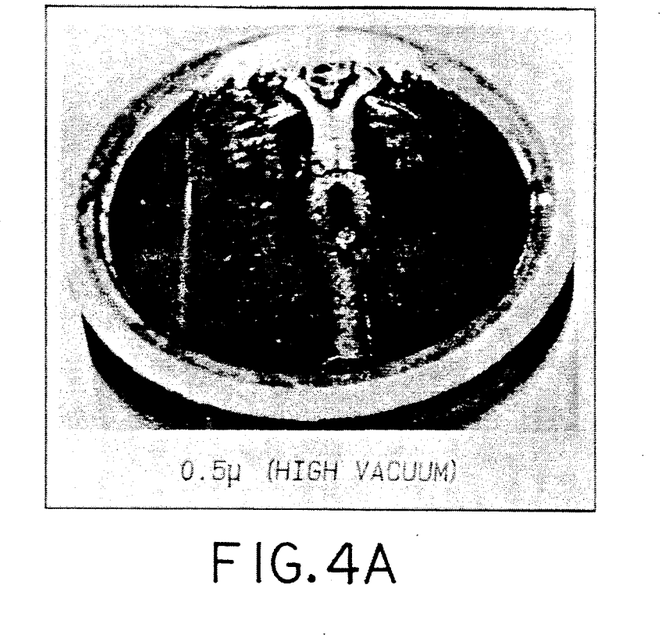
FIGS. 4a-4d are photographs of crucibles showing the effect of argon partial pressure on wetting of the crucibles by the melt.
Figure 4B:
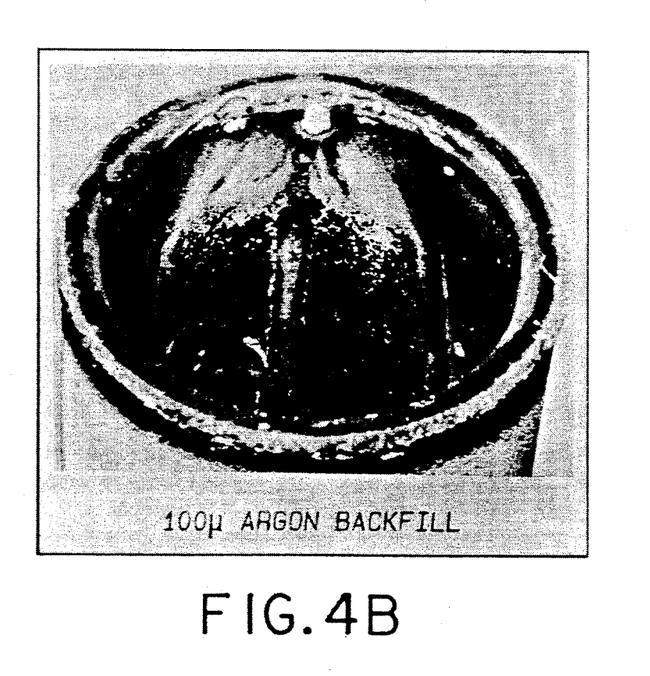
Figure 4C:
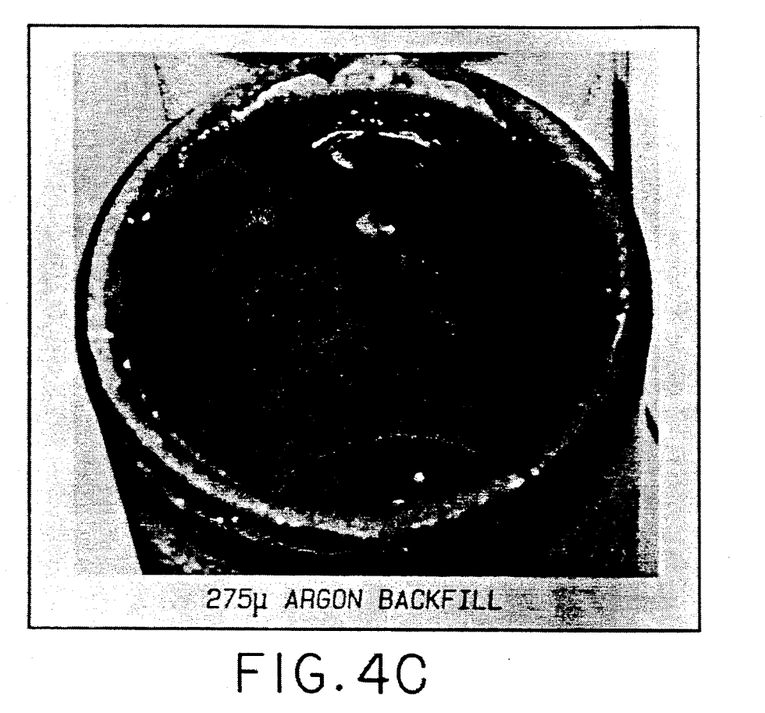
Figure 4D:
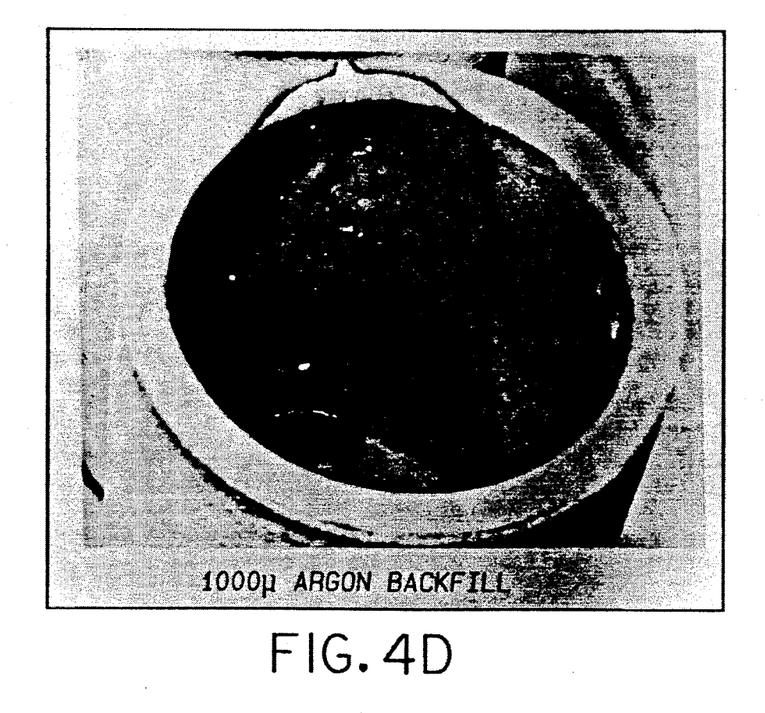
Figure 5A:
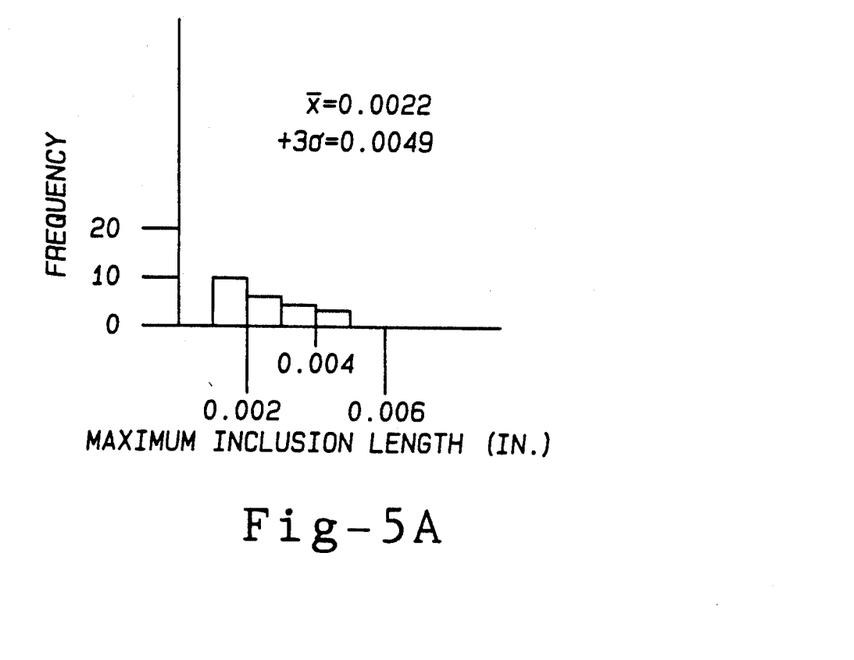
FIGS. 5a-5d and 6a-6d are histograms representing inclusion distributions found by metallographic analysis of castings made by the invention (FIG. 5) versus prior art castings (FIG. 6).
Figure 5B:
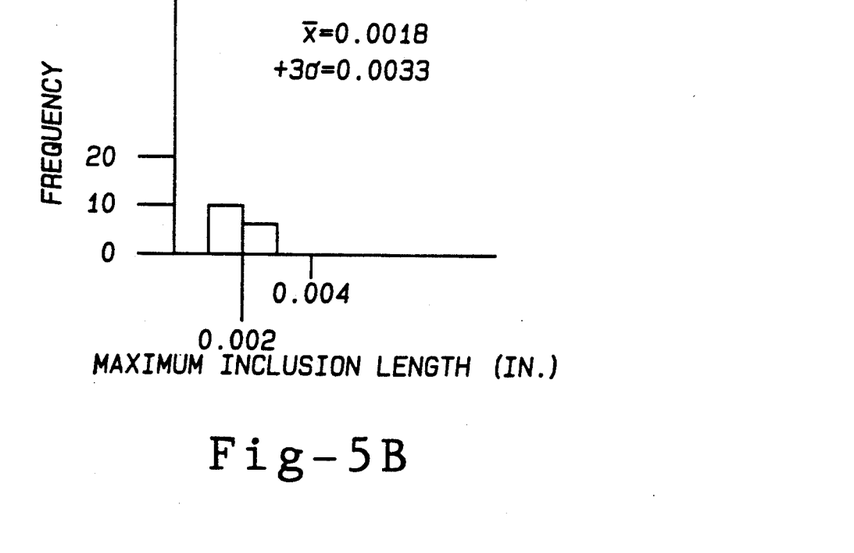
Figure 5C:
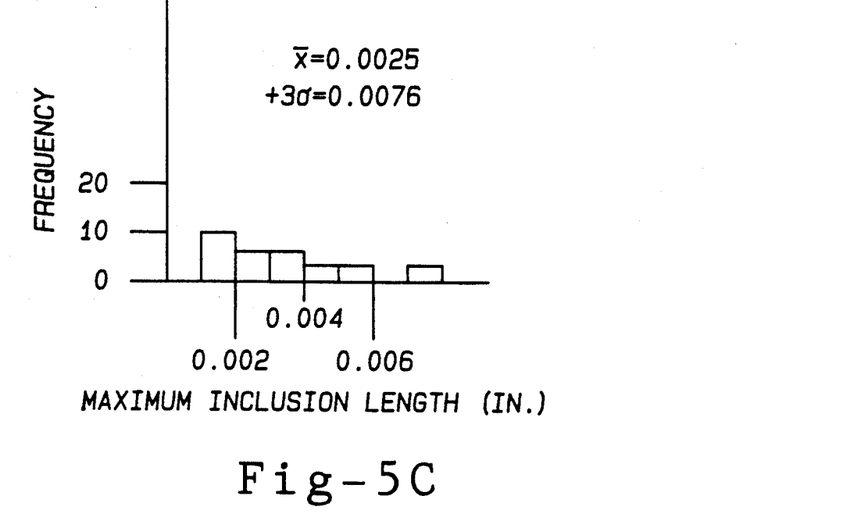
Figure 5D:
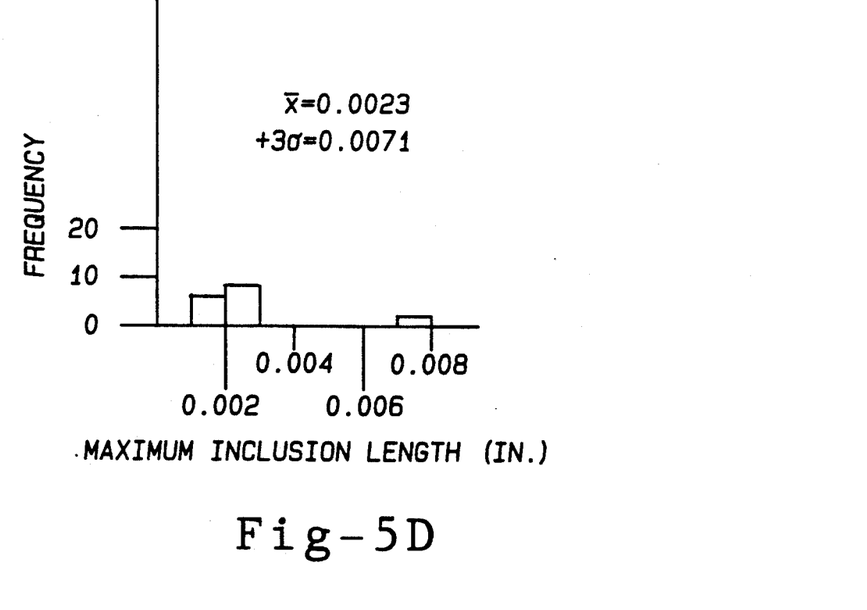
Figure 6A:
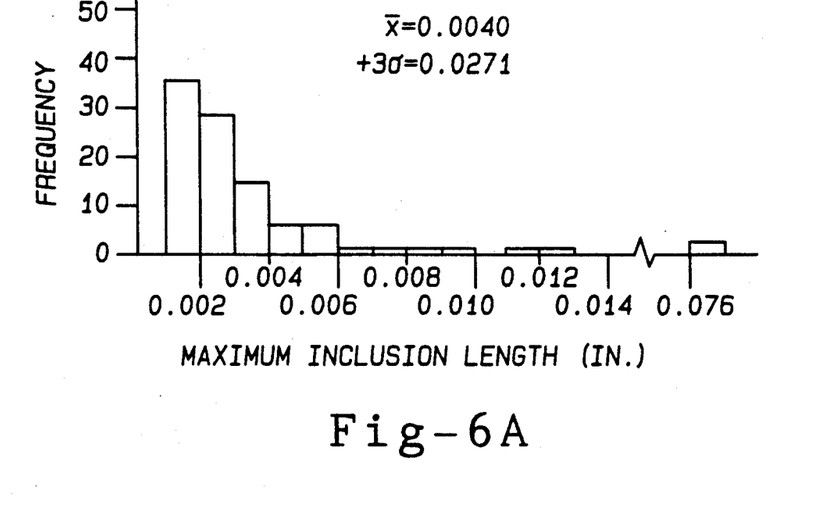
Figure 6B:
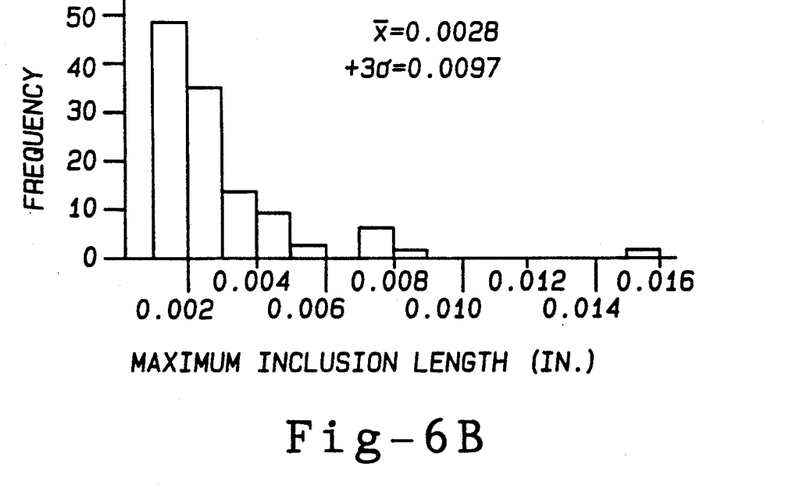
Figure 6C:
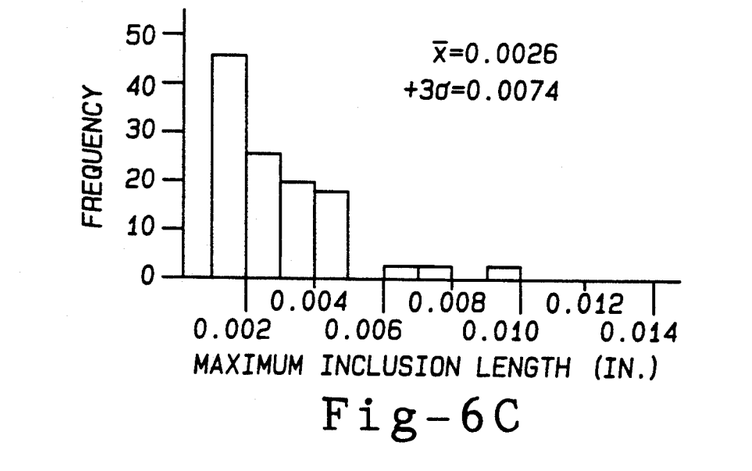
Figure 6D:
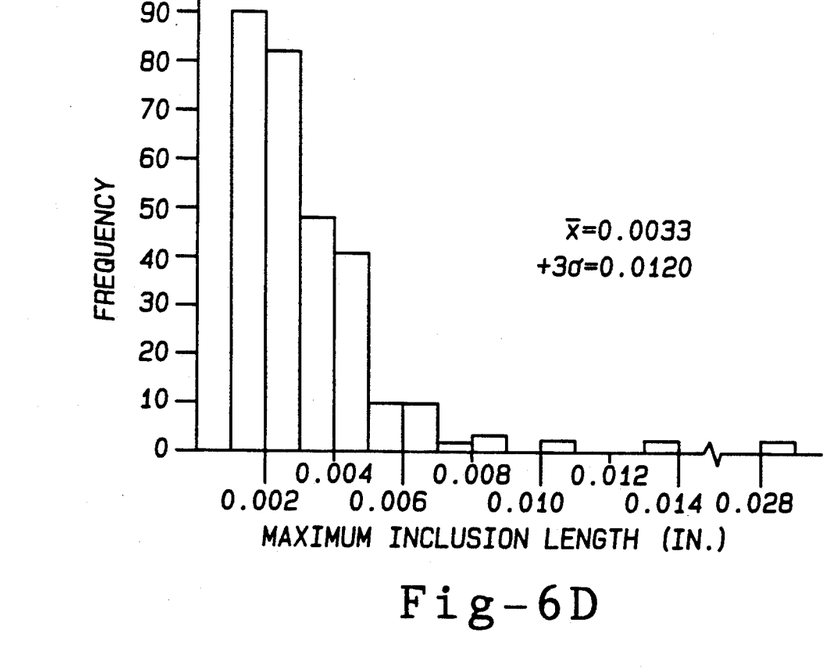

The present invention involves the discovery that the problem of unacceptably high inclusion levels observed heretofore in the vacuum melting of successive charges of superalloys including one or more volatile constituents (e.g., volatile alloying elements) in a crucible 14 arises from volatilization of such constituents under the temperature and pressure conditions of remelting and the condensation of the volatized constituents on cool regions of the crucible and melting chamber walls as condensate deposits that constitute inclusion precursors. During migration and/or after condensation at the cool regions, the volatized alloying elements may react with residual gas, such as oxygen, in the melting chamber 16, to form oxide or other inclusion precursors. For example, the cool regions on the apparatus 10 include the surface 14c of the crucible 14 between the melt line ML and the upper peripheral lip 14b. Cool regions also include the water-cooled melting chamber walls 16a. The upper melting chamber wall 16b is especially important as a source of condensate as a result of its position overlying the melt 12 in the crucible 14 and mold 20. The inclusion precursors gradually build-up over time as successive alloy charges are melted in the crucible 14 and cast until at some point in time the inclusion precursors begin to find their way into the melt by, for example, flaking off the cool regions of the crucible or being washed off the cool regions of the crucible during melting/superheating and pouring of the melt over the pour lip 14b into the mold 20. Moreover, the inclusion precursors may flake off the chamber walls 16a, especially chamber wall 16b overlying the melt 12 and mold 20. The inclusion precursors thereby enter the melt and become incorporated in the resultant casting as inclusions. A typical inclusion originating from such build-up and found in an IN713LC nickel base superalloy equiaxed casting is shown in FIG. 3 wherein the laminated morphology indicative of layer build-up over time is apparent. Each layer of the inclusion was determined to primarily comprise Al and/or Cr oxides, the Al and Cr comprising volatile alloying elements of that particular nickel base superalloy.

In accordance with one embodiment of the present invention, a partial pressure of an inert gas, such as argon, is established in the melting chamber 16 (i.e., on the superalloy melt 12 in the crucible 14) at a partial pressure level effective to reduce volatilization of the volatile alloying elements and thus formation/build-up of the inclusion precursors at the aforementioned cool regions of the crucible and vacuum chamber walls as successive alloy charges are melted and cast. The inert gas partial pressure is established by introduction of an inert gas, such as argon, from the source 26 via the associated valve V2 into the vacuum chamber 16 prior to melting of the alloy. Typically, the vacuum chamber 16 is first evacuated to subambient pressure, e.g., $<10^{-3}$ Torr, after the alloy charge is introduced into the crucible 14 through the interlock 13 and then the argon is introduced into the vacuum chamber 16 to the aforementioned effective partial pressure level.

The gas partial pressure is selected to be sufficient to suppress volatilization and migration of the volatile alloying elements from the melt to the aforementioned cool regions while avoiding trapping harmful amounts of the inert gas in the casting solidified from the melt. The gas partial pressure inhibits condensation of the volatized alloying elements at the cool regions of the crucible as well as at the vacuum chamber walls.

FIGS. 2a-2d illustrate the dependence of condensate build-up on a silica crucible liner at a high vacuum level (0.5 micron) and at different argon partial pressures (100, 275, and 1000 microns Ar) in the melting chamber 16. Each Figure was generated by vacuum induction melting 3900 grams of MAR-M-247 bar stock (nominal composition Ni-10Co-8Cr-10W-5.5Al-1.5Hf-1Ti in weight %) in a virgin silica crucible liner and holding the melt at MP plus 110° C. (MP is the melting point of the alloy) for one (1) minute. The melt was then allowed to solidify in the liner. A significant reduction in condensate build-up on the silica liner is observed as the argon partial pressure level is increased.

For the MAR-M-247 and other nickel, cobalt, and iron base superalloys such as IN713LC, MAR-M-509, IN718, a gas (e.g., argon) partial pressure in the melting chamber 16 (i.e., applied on the melt 12) generally of about 50 microns and above approaching atmospheric pressure may be used depending on the particular casting procedure employed. However, the gas partial pressure should not be so high as to entrap gas in the castings, or to otherwise adversely affect a particular casting process, such as direction solidification (DS) processes. For melting superalloys for directional solidification, an argon partial pressure of about 5000 microns is employed since the DS superalloys typically include higher levels of volatile alloyants and since the long residence time of the melt in the mold allows escape of any entrapped argon gas.

The present invention also involves the discovery that establishment of the inert gas partial pressure in the melting chamber 16 (i.e., on the superalloy melt 12 in the crucible 14) is effective to reduce wetting of the crucible 14 by the melt during the melting operation. For example, FIGS. 4a-4d illustrate a series of ceramic (zirconia) crucibles used to melt the highly wetting cobalt base superalloy, MAR-M-509, at MP plus 150° C. for 2 minutes under a high vacuum (0.5 micron) and at different argon partial pressures (100, 275, and 1000 microns). The zirconia crucible used to melt the MAR-M-509 superalloy in the high vacuum (0.5 microns) shows a significant degree of wetting by the melt. On the other hand, the degree of wetting of the zirconia crucibles by the melt is progressively reduced as the argon partial pressure is increased to 100, 275, and 1000 microns. The effect of argon partial pressures to reduce crucible wetting is beneficial in that wettability of the crucible for a particular alloy system strongly determines the life of the crucible. In particular, lower wettability of the crucible by the melt tends to retard crucible erosion by the melt, extending the crucible life and reducing crucible erosion as a source of inclusions in the melt. The beneficial effect of argon partial pressure on reduced wetting of the crucible is observed in the same general range of argon partial pressures that produces the beneficial reduction in the formation/build-up of the inclusion precursors at the cool regions of the crucible and at the vacuum chamber walls.

The following EXAMPLE is offered to illustrate, but not limit, the invention.

EXAMPLE

A series of 4 charges of IN713C alloy (composition of Ni-13.5Cr-4.5Mo-6.0Al-1.0Co-2(Cb+Ta) in weight %) were successively melted in a water cooled Cu induction skull crucible. Each charge was in the form bar stock weighing 4550 grams. After charging into the crucible, the melting chamber was evacuated to 5 microns. Then, high purity argon gas was introduced into the melting chamber from a gas cylinder external of the melting chamber to an initial Ar partial pressure level of about 360,000 microns (about ½ atmosphere Ar). Each charge was then melted by induction skull melting procedures to a superheat temperature of MP+30° C. and held at that temperature for 2-3 minutes. Each melted charge was cast from the crucible by tilt pouring into a ceramic integral rotor investment mold in the melting chamber and solidified in the mold inside the melting chamber to form an equiaxed casting. Just prior to tilt pouring, the melting chamber was evacuated to about 200 microns Ar to minimize gas entrapment in the castings.

The castings were metallographically analyzed to determine inclusion levels therein. The results are presented in the histograms shown in FIGS. 5a-5d.

The inclusion levels in the four castings made in accordance with the invention (FIGS. 5a-5d) were significantly reduced as compared to inclusion levels (FIGS. 6a-6d) found in four castings similarly melted and cast under a vacuum level of 5 microns (i.e., without an argon gas partial pressure); for example, as shown by comparing FIGS. 5a-5d and 6a-6d.

Although the invention is described hereinabove as being practiced using argon or other inert gas, the invention is not so limited and can be practiced using other gases which are inert or nondegrading toward the melt. Furthermore, although especially useful in the casting of superalloys, the invention can be used to cast other alloys such as titanium alloys. In the event the alloy to be melted is other than a nickel, cobalt, or iron base superalloy, the selection of the particular gas as well as gas partial pressure used to practice the invention will be tailored to the particular alloy to be melted.

While certain embodiments of the invention have been described in detail hereinabove, those familiar with the art will recognize that various modifications and changes can be made therein within the scope of the appended claims which are intended to include such modifications and changes.

We claim:

1. In the melting of an alloy charge including a volatilizable alloyant a melting vessel, a method of reducing inclusions in the alloy charge attributable to the melting thereof, comprising melting the charge in the melting vessel under a gas partial pressure effective to reduce volatilization of said constituent and condensation thereof on the melting vessel as one or more condensate deposits that, if present, can enter the melted charge and constitute inclusions in a casting produced therefrom.

2. The method of claim 1 wherein the gas partial pressure is established prior to melting the alloy charge.

3. The method of claim 2 including evacuating the vessel to subambient pressure prior to establishing the partial pressure of said gas.

4. The method of claim 1 wherein the melted alloy charge is heated above the alloy melting temperature in said vessel.

5. The method of claim 1 wherein the alloy charge includes one of Al, Cr, Mg, and Ti as the volatilizable alloyant.

6. The method of claim 1 including melting the alloy charge in a ceramic crucible in a manner that a cool region of the crucible lies between the melt line and an upper lip of said crucible, and said condensate deposits form at said region.

7. The method of claim 1 wherein the gas is inert to the melted alloy charge.

8. The method of claim 1 wherein the alloy charge is melted by vacuum induction melting or cold hearth melting.

9. The method of claim 6 including tilt pouring the melted alloy charge from the melting vessel into a mold such that the melted alloy flows over the cool region of said vessel.

10. In the melting of successive charges of a nickel, cobalt or iron base superalloy including one of Al and Cr as an alloying element in a melting vessel, a method of reducing inclusions in the melted charges attributable to the melting thereof, comprising successively melting the charges in the melting vessel under an inert gas partial pressure effective to reduce volatilization of said alloying element and condensation thereof on the melting vessel as one or more condensate deposits that, if present, could enter the melted charges and constitute inclusions in the resultant castings produced therefrom.

11. The method of claim 10 wherein an argon partial pressure sufficient to suppress volatilization, migration and condensation for a given application is established on the melted charges.

12. A method of melting of an alloy charge, comprising melting the charge in a melting vessel having a ceramic working surface for contacting the melt and establishing a gas partial pressure on the melted charge effective to reduce wetting of the melting vessel by the melted charge.

13. The method of claim 12 wherein the gas partial pressure is established prior to melting said charge.

14. The method of claim 12 wherein the melted charge is heated above the alloy melting temperature in said vessel.

15. The method of claim 12 wherein the gas is inert to the melted charge.

16. The method of claim 12 wherein the alloy charge is melted by vacuum induction melting.

17. The method of claim 12 including tilt pouring the melted charge from the melting vessel into a mold.

18. A method of melting successive nickel, cobalt, or iron base superalloy charges, comprising successively melting each superalloy charge in a melting vessel having a working ceramic surface for contacting the melted charges and establishing an inert gas partial pressure on each melted charge effective to reduce wetting of the melting vessel thereby.

19. In the melting of an alloy charge including a vaporizable alloyant in a melting vessel, a method of reducing inclusions in the melted alloy charge attributable to the melting thereof, comprising a) melting the charge in the melting vessel under a gas partial pressure effective to reduce volatilization of said alloyant and condensation thereof on the melting vessel as one or more condensate deposits that, if present, can enter the melted charge and constitute inclusions in a casting produced therefrom and b) reducing the gas partial pressure in the melting chamber prior to casting the melted charge from the melting vessel to reduce gas entrapment in said melted charge and thus in the casting produced therefrom.

20. In the melting of successive charges of a nickel, cobalt, or iron base superalloy including one of Al or Cr as an alloying element in a melting vessel, a method of reducing inclusions in the melted alloy charge attributable to the melting thereof, comprising a) successively melting the charges in the melting vessel under a gas partial pressure effective to reduce volatilization of said alloyant and condensation thereof on the melting vessel as one or more condensate deposits that, if present, can enter the melted charges and constitute inclusions in the resultant castings produced therefrom and b) reducing the gas partial pressure in the melting chamber prior to casting the melted charge from the melting vessel to reduce gas entrapment in said melted charge and thus in castings produced therefrom.

21. In the remelting of successive prealloyed metal alloy charges including a vaporizable alloyant in a melting vessel, a method of reducing inclusions in the melted charge attributable to the melting thereof, comprising a) successively melting the charges in the melting vessel under a gas partial pressure effective to reduce volatilization of said alloyant and condensation thereof on a pouring region of the melting vessel as one or more condensate deposits that, if present, can enter the melted charges and constitute inclusions in a casting produced therefrom and b) casting the melted charge over the pouring region of the melting vessel into a mold.

22. In the melting of successive charges of a nickel, cobalt, or iron base superalloy including one of Al or Cr as an alloying element in a melting vessel, a method of reducing inclusions in the melted alloy charge attributable to the melting thereof, comprising a) successively melting the charges in the melting vessel under a gas partial pressure effective to reduce volatilization of said alloyant and condensation thereof on a pouring region of the melting vessel as one or more condensate deposits that, if present, can enter the melted charges and constitute inclusions in the resultant castings produced therefrom and b) casting the melted charge over the pouring region of the melting vessel into a mold.

* * * * *

UNITED STATES PATENT AND TRADEMARK OFFICE
CERTIFICATE OF CORRECTION

PATENT NO. : 5 226 946
DATED : July 13, 1993
INVENTOR(S) : Randall S. DIEHM et al It is certified that error appears in the above-identified patent and that said Letters Patent is hereby corrected as shown below:

```
Column  7, line 11; after "alloyant" insert
                ---in---.
```

Signed and Sealed this

Twenty-ninth Day of March, 1994

Attest:

BRUCE LEHMAN

Attesting Officer     Commissioner of Patents and Trademarks